United States Patent
Hamblen

[11] 4,022,855
[45] May 10, 1977

[54] METHOD FOR MAKING A PLASTIC OPTICAL ELEMENT HAVING A GRADIENT INDEX OF REFRACTION

[75] Inventor: David P. Hamblen, Rochester, N.Y.

[73] Assignee: Eastman Kodak Company, Rochester, N.Y.

[22] Filed: Mar. 17, 1975

[21] Appl. No.: 558,741

[52] U.S. Cl. .............................. 264/1; 204/159.22; 204/159.23; 264/22; 264/311; 264/347
[51] Int. Cl.² ...................... B29C 5/04; B29D 11/00
[58] Field of Search .................. 264/1, 311, 25, 22, 264/347; 204/159.22, 159.23

[56] References Cited
UNITED STATES PATENTS

| | | | |
|---|---|---|---|
| 2,423,583 | 7/1947 | Cooper, Jr. | 88/57 |
| 3,083,552 | 4/1963 | Carlson et al. | 264/311 |
| 3,256,373 | 6/1966 | Horst | 264/1 |
| 3,408,429 | 10/1968 | Wichterle | 264/1 |
| 3,486,808 | 12/1969 | Hamblen | 350/175 |
| 3,557,261 | 1/1971 | Wichterle | 264/1 |
| 3,699,089 | 10/1972 | Wichterle | 264/1 |
| 3,864,143 | 2/1975 | Fantazier et al. | 264/25 |
| 3,872,042 | 3/1975 | Bond | 264/1 |
| 3,953,620 | 4/1976 | Chandross et al. | 264/22 X |

Primary Examiner—Philip Anderson
Attorney, Agent, or Firm—John D. Husser

[57] ABSTRACT

A centrifugal molding method is provided for making a plastic lens having a gradient index of refraction. A reusable silicone rubber mold is placed in a rotatable mold carrier and two copolymerizable monomer compositions containing monomers having different indices of refraction are combined in the mold to form a polymerization mixture which has an index of refraction varying radially outward from its axis of rotation. The first monomer composition is placed in the mold and, while the mold is rotating sufficiently to force the first monomer composition to the outside edge of the mold, a second monomer composition is introduced via hypodermic injection into the center of the mold. The speed of rotation is reduced and the two monomer compositions diffuse one into the other in a controllable manner. Ultraviolet exposure, either directly on the mold or variably through a photographic mask with varying density, modifies the diffusion by initiating polymerization and increasing the viscosity of the monomer compositions. Finally the monomer compositions in the mold are completely polymerized by heat curing in an oven.

14 Claims, 11 Drawing Figures

METHOD FOR MAKING A PLASTIC OPTICAL ELEMENT HAVING A GRADIENT INDEX OF REFRACTION

BACKGROUND OF THE INVENTION

This invention relates to methods for preparing a plastic lens element having a gradient index of refraction. More specifically, the method involves introducing first and second monomer-containing compositions, each having a different index of refraction, into a centrifugal mold in accordance with a controlled procedure whereby a transparent element is produced which has a continuous gradient in refractive index extending in a direction radially outward from the rotational axis of the centrifugal mold.

DESCRIPTION OF THE PRIOR ART

The use of plastic materials, instead of glass, in the manufacture of various types of optical and other lens-like media has many potential advantages. Generally, the plastics are less expensive than the glass used to form an optical element. In addition, finishing operations such as polishing and the like usually necessary with respect to glass optical elements are substantially avoided with respect to molded plastic lenses.

It is well known in the art to produce single index of refraction optical lenses from a cross-linkable monomer that is polymerized and solidified by heat curing in its mold. In this technique, it is customary to provide a stationary injection mold having optical quality mold faces supported in spaced relation by a deformable sidewall. Since these monomers frequently shrink volumetrically when polymerized, the faces of the mold must be moved together at a rate corresponding to the shrinkage of the monomer in passing into the polymerized phase (see, for example, U.S. Pat. No. 2,542,386, to Beattie).

In addition to injection molding, it is well known to mold various polymeric objects by centrifugal casting, such as, for example, parabolic mirrors from epoxy resins and hydrogel contact lenses from monomer mixtures capable of three dimensional polymerization. By this technique, contact lenses with a single index of refraction have been prepared in an open mold cavity having a concavely curved bottom surface which is rotated about an upright axis, traverse of that surface. There is obtained a shape-retaining polymer body having a convex bottom surface conforming to the mold surface, and a concave top surface, formed by the rotation of the open mold, which has approximately the shape of a paraboloid (see, for example, U.S. Pat. 3,660,545, to Wichterle). Thus, in this method, the case monomer is shaped not only by centrifugal force, gravity and surface tension, but also by contact with the concave mold.

In the aforementioned centrifugal casting technique, the convex surface of the monomeric liquid is deformed to some extent by surface tension in contacting the concave mold surface. Also, the concave surface of the monomeric liquid, which is exposed to the open air, is limited in the shapes it may assume. To overcome these limitations, processes have been proposed to envelope the cast monomeric liquid with several shaping liquids of differing weights so as to prevent the cast liquid from contacting the wall of the rotating molding container (see for example, U.S. Pat. No. 3,691,263, to Stoy et al). Depending upon choice of liquids, the concave surface of the monomeric liquid can assume shapes other than the customary paraboloid shape.

The foregoing examples of prior art techniques for fabricating plastic lenses have the desirable features of simplicity and economy. However, it has been found difficult to obtain plastic materials that possess physical and mechanical properties suitable for forming optical elements of precise configuration. Specifically, if the lens is formed of a material having a uniform index of refraction, the optical surface of the plastic material must be precisely curved to produce the desired optical properties. The need for precision of curvature diminishes as the index of refraction is made to vary across the optical face, since, in that instance, curvature of the surface is not solely responsible for the desired deflection of incident light.

U.S. Pat. No. 3,485,556 discloses a prior art technique for making a multifocal, plastic, opthalmic lens with a refractive index gradient. This method essentially embodies the sequential layering of one monomeric composition atop another in a stationary upright mold assembly so that the two monomers diffuse by gravity across their liquid interface to establish a longitudinal zone of refractive gradient. Typically, the diffusion step is closely controlled under isothermal conditions to obtain a predetermined diffusion rate and a predetermined depth and degree of diffusion. Diffusion is arrested at the desired point by polymerizing the monomeric liquids.

U.S. Pat. No. 3,718,383 discloses another method for obtaining a gradient refractive index which involves diffusing an organic diluent into a transparent solid polymeric matrix having an optical axis. The organic diluent possesses an index of refraction which differs from that of the polymeric matrix; and when the diluent is disturbed by diffusion into the matrix, it forms a continuous gradient in refractive index across the matrix, perpendicular to the optical axis.

While the prior art discussed above shows that plastic optical elements having a gradient index of refraction have been prepared by various techniques, the elements made in accordance with these prior art techniques suffer from aberrations and have only limited apertures with half fields of a very few degrees. Accordingly, an improved method for making plastic, gradient-refractive-index, optical elements, with improved aberration and half field characteristics would be a substantial advance in the art.

SUMMARY OF THE INVENTION

I have found that the problems associated with the aberrations and limited apertures characteristic of elements manufactured in accordance with prior art tachniques can be surmounted by combining certain features of the previously separate and seemingly incongruous arts of centrifugal casting and stationary diffusion of optical grade polymerization compositions. With this advance, a single plastic element having a gradient index of refraction can be produced to replace a number of elements in a lens array, thus providing substantial savings in the manufacture of lens systems.

In accordance with one preferred embodiment of my invention a mold cavity is filled over a period of time with a mixture which contains at least copolymerizable monomer compositions and which varies as to the volumetric ratio of those compositions during the filling period. Each monomer composition includes a monomer which has an index of refraction that differs from that of the other composition. In combination, the monomers form a portion of the mixture in which the gradient index of refraction varies in accordance with the ratio of the component compositions in the polymerization mixture. During at least a part of the filling step the mold is rotated about an axis of rotation to generate centrifugal forces which advance the formation of a gradient index of refraction in the polymerization mixture. When the mold has been filled and the gradient index of refraction has been sufficiently advanced by rotation, the mixture is polymerized to form an optical element having a gradient index of refraction in a direction generally radial to the axis rotation of the mold.

Another more specific embodiment of the method utilizes two individual molding halves formed of a flexible, resilient material and mounted within a mold carrier. At least one wall of the resulting mold is constructed to permit ultraviolet light to enter the molding cavity. A first composition, including a monomer such as allyl diethylene glycol 2-carbonate mixed with a polymerization catalyst and an ultraviolet sensitizer, is introduced into the mold cavity. The mold is then rotated at a speed sufficient to force the first composition outwardly by centrifugal force; and a second composition, including a monomer, such as diallyl phthalate, which has an index of refraction differing from that in the first composition is introduced into the mold near the axis of rotation in a manner avoiding diluting the first composition. The rotational speed of the mold is then reduced to allow the two compositions to diffuse. After a predetermined period of diffusion, polymerization of the monomers is initiated by an ultraviolet radiation exposure. Finally the mixture is completely polymerized, for example in an oven, to produce a hard, shaped transparent optical element having a gradient refractive index.

A principal object of this invention is to provide a method for making a plastic, gradient-refractive-index optical element which provides improved optical correction and more useful aperture and half field.

The invention, and its objects and advantages, will becme more apparent in the detailed description of the preferred embodiment presented below.

BRIEF DESCRIPTION OF THE DRAWINGS

In the subsequent detailed description, reference is made to the accompanying drawings wherein the same reference characters indicate corresponding parts throughout the several views of the drawing and in which.

DESCRIPTION OF THE PREFERRED EMBODIMENTS

Figure 1:
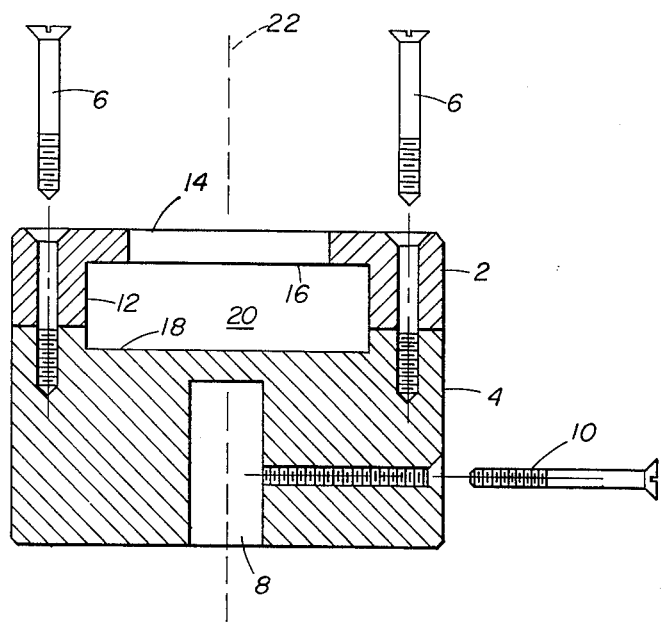
FIG. 1 is an exploded, sectional view illustrating a molding device useful in practice of the present invention.

Referring to FIG. 1, there is shown a mold carrier consisting of carrier base 4 and carrier cap 2 secured thereto by means of mounting screws 6. The carrier base 4 also comprises at one end a recess 8 for receiving and securing, by means of a set screw 10, a drive shaft for rotating the mold carrier on axis 22. The recess 8 is centered on the axis of rotation 22 so that a centrifugal force is established about that axis when the molding carrier is rotated. The carrier base 4 and cap 2 commonly define an interior sidewall 12, and an opening 14 is provided in upper interior wall 16 of cap 2 to allow for the introduction of ultraviolet radiation. Suitable transparent material may be provided in lieu of opening 14. Sidewall 12, upper interior wall 16 and a bottom wall 18 define a cylindrical mold carrier cavity 20 which is configured to receive the molds of FIGS. 2A, 2B or 2C and support such a mold with its axis of rotation aligned with axis 22.

Figure 2A:
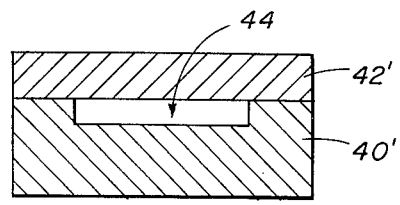
FIG. 2a–c are cross-sectional views illustrating preferred embodiments of the lens molds useful with the molding device of FIG. 1.
Figure 2B:
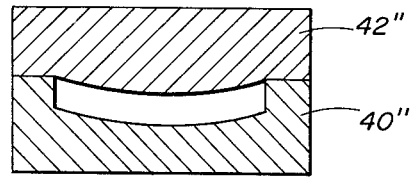
Figure 2C:
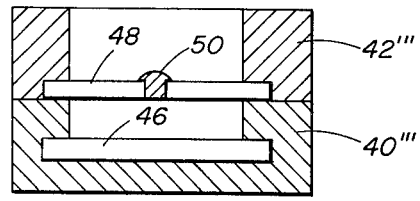

FIGS. 2a–c are cross-sectional views of several preferred embodiments of rubber molds for casing a gradient-refractive-index lens according to the method of this invention. These embodiments are exemplary of the wide variety of molds useful according to the present invention rather than as indicating the only useful configurations. The molds shown in these Figures include lids 42', 42" and 42'" resting on bases 40', 40" and 40'" respectively. The molds in FIGS. 2a and 2b are formed of rubber having an optically smooth surface on portions defining the mold cavity. The mold of FIG. 2a is configured to cast a flat lens, while FIG. 2b shows a mold for casting a positive meniscus lens. FIG. 2c illustrates a mold cavity for casting a flat lens between two glass plates 46 and 48 having appropriate optically smooth surfaces.

Figure 3A:
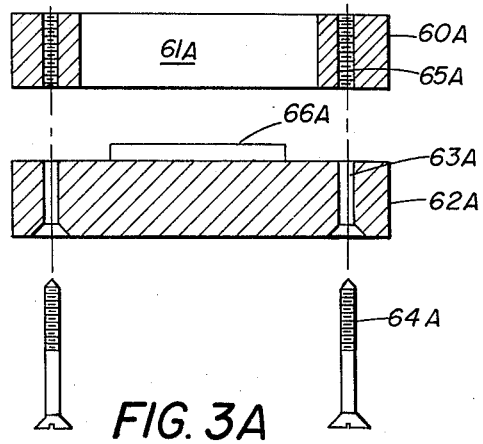
FIGS. 3a–f are exploded cross-sectional views illustrating several preparatory matrices for making the molds such as shown in FIGS. 2a–c.
Figure 3B:
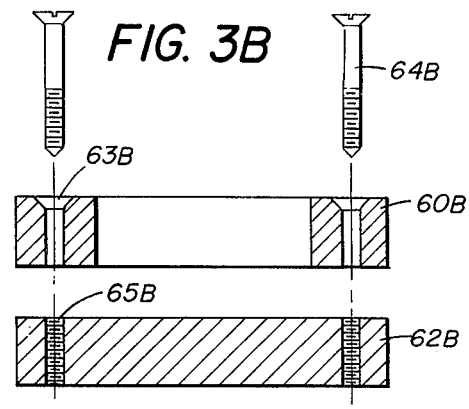

The mold illustrated in FIG. 2a can be fabricated by use of the matrices such as illustrated in FIGS. 3a and 3b. FIG. 3a illustrates a plexiglass matrix for casting the base 40' of the mold shown in FIG. 2a and includes a generally annular top portion 60a having a cylindrical cavity 61a and a bottom portion 62a. A screw clearance hole 63a passes through bottom portion 62a and a threaded tap hole 65a concentric therewith is located in top portion 60a to receive screws 64a. An optically polished raised surface 66a is located on the upper surface of base 62a and centered within the cavity 61a.

Lid 42' of the mold shown in FIG. 2a can be fabricated in the plexiglass matrix illustrated in FIG. 3b. In a manner similar to that discussed above, top 60b is fastened to base 62b by screws 64b passing through the screw clearance holes 63b and engaging the threaded tap holes 65b. The upper surface of base 62b is optically polished and molds a corresponding optical surface on lid 42' in FIG. 2a facing downward in molding cavity 44.

Mold materials for casting in the plexiglass matrices of FIGS. 3a and 3b can be ceramic or other materials to which the monomers will not adhere, silicone rubber being particularly useful. No treatment other than a blast of clean air is necessary to clean the molds under normal working conditions and then they can be subsequently reused. It is desirable as hereafter shown to cast the lid 42' of a transparent silicone rubber to enable ultraviolet radiation to pass therethrough. The base 40' can be cast from an opaque rubber material.

Figure 3C:
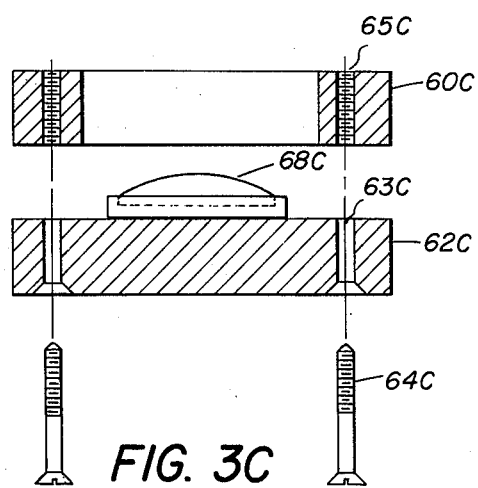
Figure 3D:
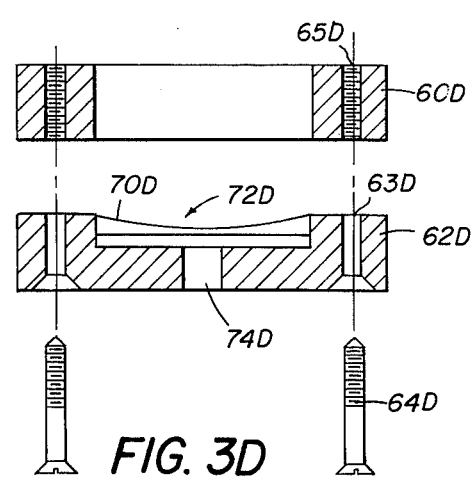

The rubber molds 40", 42" shown in FIG. 2b can be cast from the plexiglass matrices such as shown in FIG. 3c and 3d. Referring to FIG. 3c, in manner similar to that discussed in conjunction with FIG. 3a, top 60c is fastened to base 62c by screws 64c passing through the screw clearance holes 63c and engaging the threaded cap holes 65c. In like manner, in FIG. 3d, top 60d is fastened to base 62d by screws 64d passing through the screw clearance holes 63d and engaging the threaded cap holes 65d. Also in like manner, referring to FIG. 3e, top 60e is fastened to base 62e by screws 64e passing through the screw clearance holes 63e and engaging the threaded cap holes 65e. Also, in FIG. 3f, top 60f is fastened to base 62f by screws 64f passing through the screw clearance holes 63f and engaging the threaded cap holes 65f. It is to be noted that a positive glass lens 68c of proper radius is utilized to provide the silicone rubber mold 40'' with optical surface quality to form the front surface of the meniscus lens. Similarly a negative planoconcave glass lens 70d is inset in recess 72d of the matrix shown in FIG. 3d to provide the silicone rubber mold 42'' with optical surface quality to form the rear surface of the meniscus lens. The lens 70d can be adjusted by suitable means (not shown) acting by way of an access hole 74d to adjust the configuration of mold 42'' and thus the thickness and focal length of the final lens.

Figure 3E:
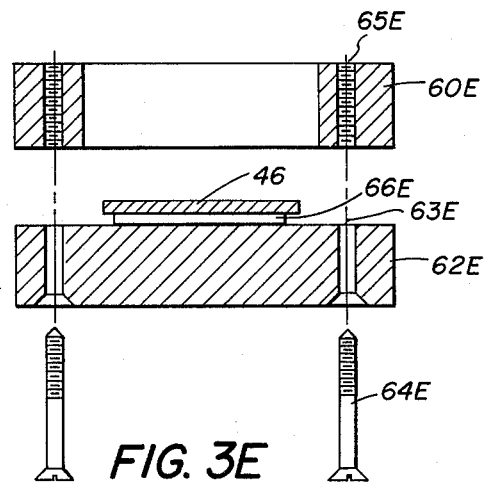
Figure 3F:
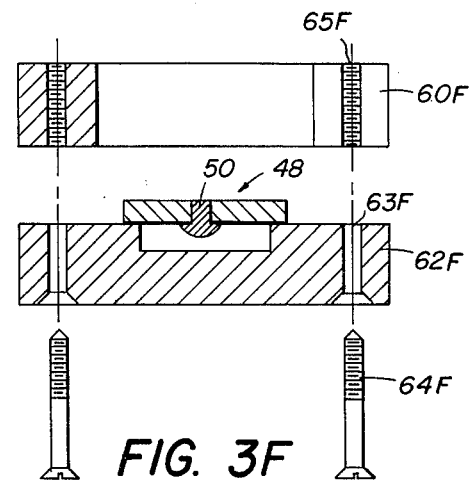

Base 40''' of the mold shown in FIG. 2c is cast from the matrix illustrated in FIG. 3e wherein glass disk 46 rests without attachment on raised surface 66e. When the rubber molding material hardens in place, glass disk 46 is secured therein as shown in FIG. 2c and is removable with the base 40''' from the form. FIG. 3f illustrates the matrix for casting the lid 42''' of the mold in FIG. 2c. The glass disk 48 is removable with the lid 42''' from the matrix as described with regard to element 46 of matrix 62e. Disk 48 has a small center hole through which hypodermic insertion of the monomer compositions can be effected. To minimize the effect of a sprue impression during molding of the lens, the center hole is filled with a silicone rubber plug 50 whose molding surface is in line and parallel to glass disk 48. The soft rubber plug 50 allows for easy penetration of the hypodermic needle and closes without making a large sprue impression on the center surface of the plastic lens forming beneath the plug.

Having described the apparatus illustrated in FIGS. 1–3, the method steps involved in production of plastic optical elements utilized in accordance with certain embodiments of the invention will now be described.

Initially the molded silicone rubber parts previously described are combined into the molds illustrated in FIGS. 2a, 2b, and 2c. Since mold carrier and an inserted mold are rotated at speeds up to 3500 rpm, a good seal is necessary along the faces where the lid and the base of the mold are in contact to prevent leakage of injected monomer compositions. The adhesion between the silicone rubber materials makes a good gasket when the closure of carrier cap 2 onto carrier base 4 squeezes the silicone rubber faces tightly together. The soft rubber of the lids 42', 42'', 42''' allows for easy penetration of a hypodermic needle in a later step and closes without making a large sprue imperfection on the center surface of the lens thereunder.

After the lid and base of the mold insert are joined forming a molding cavity therebetween, and after the joined mold is settled into the cylindrical mold carrier cavity 20 of the mold carrier, a first copolymerizable composition is introduced into the molding cavity. This may be done before the lid is secured onto the base or by hypodermic insertion through the lid in the aforementioned manner. The monomer utilized in the composition desirably, is one which, during curing, becomes increasingly viscous, then gels uniformly throughout the resinous mass, and after progressive hardening forms a cross-linked polymer. The cured polymer should have high resistance to warping and distortion, to impact, and to abrasion. Allyl diethylene glycol 2-carbonate has been found to meet these requirements. A catalyst such as benzoyl peroxide and an ultraviolet sensitizer such as benzophenone are also provided in the monomer composition to be inserted into the mold cavity. It is to be noted that this type of monomer may shrink when passing through the curing phase into a solidified polymer, and the soft silicone rubber lid and base can be compressed to allow the sides and faces of the mold to be moved together to compensate for the shrinkage.

In one preferred embodiment of the invention, the mold carrier is rotated about its axis 22 at a high speed, for example 3500 rpm, and the second copolymerizable monomer composition is hypodermically injected into the mold cavity during such rotation. Such high speed rotation centrifugally forces the first monomer composition radially outward against the walls of the mold cavity before and during the insertion of the second monomer composition into the mold cavity. In this way, uncontrolled dilution of the first monomer by the second monomer is prevented at the moment of injection. The two monomers respectively utilized in the first and second copolymerization compositions should be mutually soluble, chemically compatible and capable of forming copolymers. Obviously to establish a gradient index of refraction the two monomers should have different indices of refraction when polymerized. I have found diallyl phthalate when mixed with a catalyst and sensitizer such as described above in connection with the first introduced polymerization composition to be suited for use in the second introduced composition. Other mixtures of different first and second compositions can be used, but the diallyl phthalate-allyl diethylene glycol 2-carbonate system provides a suitable index of refraction range for most lens designs.

A partial listing of other monomeric materials for the second composition and their refractive indices for diffusion into the allyl diethylene glycol 2-carbonate of the first composition may be found in Table I hereinbelow.

TABLE I

| Monomeric Materials for the Second Monomer Composition | |
|---|---|
| Name | Index of Refraction |
| dibutyl phthalate | 1.4926 |
| vinyl acetate | 1.5129 |
| methyl methacrylate | 1.4913 |
| methyl methacrylate | 1.492 |
| methylthio-2-norbornylmethyl methacrylate | 1.549 |
| 2-norbornylmethyl methacrylate | 1.519 |
| o-chlorostyrene | 1.602 |
| styrene | 1.59+ |

After the second monomer composition is injected, the speed of the molding carrier and the associated mold is reduced to a predetermined level, for example 1000 rpm. The rotation is continued over a predetermined period of time, for example, 2 hours, to allow the desired degree of diffusion of one monomer into the other. The rate of diffusion can be adjusted over a wide range by exposing the monomers to ultraviolet radiation through the U.V. transparent lid. That is since the U.V. exposure in conjunction with the sensitizer mixed with the monomers induces increasing viscosity and ultimately gelation of the monomer compositions, such exposure provides a means for the mold operator to selectively vary the gradient profile.

The refractive index can be influenced also by preliminary ultraviolet exposure of the first monomer located toward the outside of the lens mold. For example, by providing a U.V. exposure through a photographic mask having an outwardly decreasing density profile, the initial viscosity can be caused to increase in the direction from the inside of the mold cavity outward to the edge. The second monomer is therefore caused to diffuse against a fluid with an increasing variation in viscosity and the gradient index profile is changed from that obtained in free diffusions.

Finally, after continued gelation of the monomer compositions, the rotation of the mold carrier is stopped and the rubber mold is removed from the cavity 20 and placed in a programmable oven for polymerization of the diffused monomers. The resulting product is a hard, transparent plastic optical element with optical quality surfaces which when in the form of a single-element optical lens is well corrected with a useful aperture and half field, and minimal aberrations.

Figure 4:
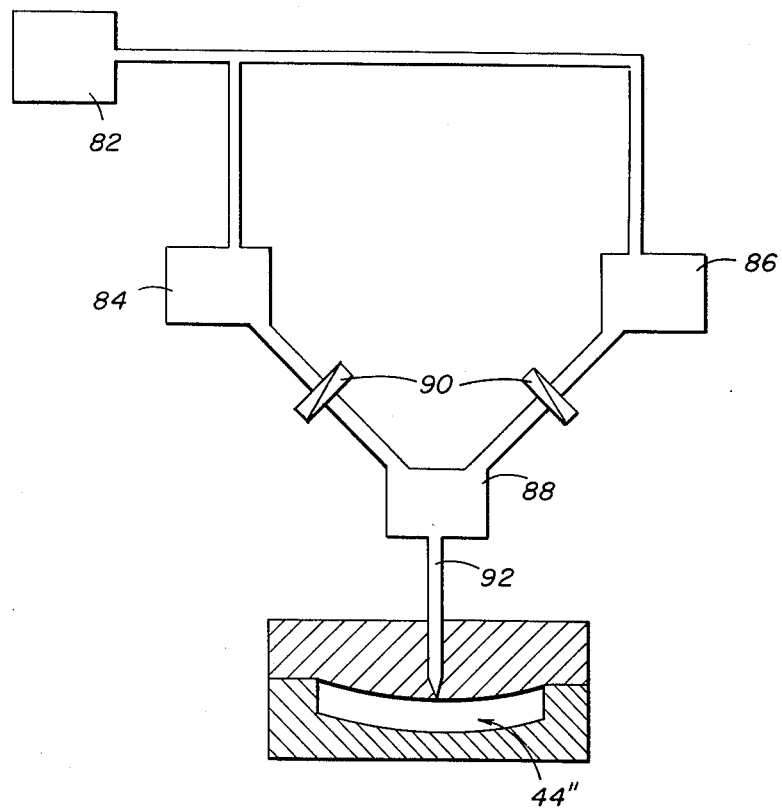
FIG. 4 is a schematic representation of another apparatus useful in practice of the present invention.

An alternative to the embodiment of the invention described above, involves feeding two copolymerization monomer compositions of the type previously described, simultaneously but at varying proportional rates, into the rotating mold as shown schematically in FIG. 4. Referring to FIG. 4, a pressure source 82 is sown in communication with a supply chamber 84 of a first monomer composition and a supply chamber 86 of a second monomer composition. Variable flow rate control valves 90 allow a polymerization mixture of the two monomer compositions to flow under pressure at predetermined rates, which vary in relative proportion over the filling period, into mixing chamber 88. That is, while the mold is rotating at a speed, e.g., in the range of 300–1000 rpm, the mixture is first injected into the center of the rotating mold cavity 44" by way of needle injector 92 with a first ratio of flow between the two monomer compositions. Thereafter, with the mold still rotating, control valves 90 are continuously, or periodically, adjusted during the filling period so that the relative percentage concentration of the monomers varies radially within the mold cavity 44". After an overall U.V. exposure, as described below, the mold is removed and heated in an oven in accordance with a program such as is described with respect to Example 1 so that an element having a continuously varying index of refraction is formed within mold cavity 44". In this embodiment the refractive gradient occurs rapidly, without waiting for the diffusion of the two monomers.

Various non-limiting embodiments of the present invention are illustrated by the following examples.

EXAMPLE 1

A lens with plane parallel optical surfaces is produced in accordance with the present invention by preparing a first monomer composition of Allyl Diethylene Glycol 2-carbonate, 4 wt.% Benzoyl Peroxide catalyst and 1 wt.% Benzophenone U.V. sensitizer. A mold cavity such as shown in FIG. 2A is filled with the first monomer composition to ½ of its total volume or about 0.10 cc. A second monomer composition is prepared from Diallyl Phthalate and the same quantities of Benzoyl Peroxide and Benzophenone. Then the mold is rotated at 3500 rpm as the second monomer composition is hypodermically injected into the center of the mold cavity through its lid. Rotation of the mold is then decreased to about 1000 rpm and diffusion of the two monomers proceeds for 2 hours. After 2 hours of continued diffusion under U.V. exposure from a 100 watt U.V. lamp partially focused upon the mold, gelation of the monomer compositions results, at which time the rubber mold is removed from the mold carrier and placed in a programmable oven for polymerization of the diffused monomers. The oven is programmed to the following schedule: (1) raise the temperature gradually over a period of 2 hours from 25° C to 115° C; (2) hold the oven at 115° C for 2 hours; (3) turn off the oven and allow the oven to cool at its own rate to room temperature. Then the lens specimen can be removed from the mold.

The resulting flat disk is hard and transparent, with optical quality surfaces having a radial distribution of refractive index.

EXAMPLE 2

A second lens with plane parallel optical surfaces is prepared in accordance with another embodiment of the present invention by first premixing the two monomer compositions of Example 1 in a ratio of 85 vol. % first monomer composition and 15 vol. % second monomer composition. This first mixture has an index of refraction upon polymerization equivalent to $n=1.51$. This first mixture is injected into ½ the volume of the mold cavity or about 0.10 ml. A second mixture comprising 70 vol. % first monomer composition and 30 vol. % second monomer composition is prepared, which of itself yields a refractive index of $n=1.52$. While the mold is rotating as in Example 1, the second mixture is injected into the center of the mold cavity until the cavity is filled. Diffusion and polymerization are continued as in Example 1. The result is a hard, transparent flat lens.

EXAMPLE 3

A positive meniscus lens is prepared in a mold such as illustrated in FIG. 2b which is filled with two monomer compositions or mixtures according to the method of either Examples 1 or 2. Diffusion occurred for 195 minutes at 1000 rpm and continued at the same speed for 60 more minutes under U.V. exposure. Further steps followed Example 1.

EXAMPLE 4

Another positive meniscus lens is prepared in accordance with the present invention by first selecting a variable density mask that corresponds generally to the area on the mold lid (FIG. 2b) subtended by the rear surface of the meniscus lens. The photographic mask is constructed so as to have a decrease in density radially outward from the center of the molding cavity with the center itself being opaque to U.V. transmission. Decreasing density in the mask corresponds generally to the volume of the first monomer composition when the molding carrier is rotated and the monomer is forced outward toward the walls of the molding cavity. The molding cavity is filled with two monomer compositions as in Example 1. Then the photographic mask is placed over and adjacent to the mold lid while the mold rotates at 1000 rpm with ultraviolet exposure for 30 minutes. Then diffusion continues for 40 minutes without U.V. exposure. Next the mask is removed and the monomer compositions are given an overall U.V exposure for 30 minutes while continuing to rotate the mold at 1000 rpm. Polymerization by heat according to Example 1 follows. The result is a positive meniscus lens showing minimum distortion across full aperture.

It will be appreciated by one skilled in the art that various optical design requirements can be satisfied by adjusting the index difference between the first and second introduced monomer compositions, e.g., by premixing such compositions to achieve a desired maximum (center lens) index and minimum (outer edge) index respectively for the second and first introduced compositions.

The invention has been described in considerable detail with particular reference to certain preferred embodiments thereof, but it will be understood that variations and modifications can be effected within the spirit and scope of the invention.

I claim:

1. A method of fabricating a plastic optical element having a gradient index of refraction, said method comprising:
   a. providing first and second copolymerizable monomer compositions each having a different index of refraction;
   b. introducing said compositions concurrently into an element cavity of a mold over a period of time and at respective introduction rates such that the proportion of said first composition introduction to said second composition introduction is less at the end of said period than at the beginning of said period;
   c. rotating said mold on a central axis of its cavity at a speed sufficient to obtain centrifugal distribution of said compositions during at least a portion of said period so that the index of refraction of the composite mixture is said cavity varies gradiently, radially outwardly from the central axis; and
   d. polymerizing said mixture to produce a shaped optical element having a gradient index of refraction.

2. A method of fabricating an optical element having a gradient index of refraction, said method comprising:
   a filling a mold having a mold cavity with a polymerization mixture comprising two copolymerization compositions, each composition respectively having a different index of refraction, in a manner such that the volumetric ratio of said compositions in the mixture varies during the filling step; and rotating the mold about a central mold axis during at least a part of the filling step at a speed sufficient to obtain centrifugal distribution of said mixture thereby forming a gradient index of refraction in a polymerization mixture; and
   b. polymerizing the mixture to produce a shaped optical element having a gradient index of refraction in a direction generally radial to the axis of rotation of said mold.

3. A method acccording to claim 2 in which the filling and rotating step comprises:
   rotating the mold about said axis, while said mold contains a first of said two copolymerization compositions, at a first speed sufficient to force said first composition toward the radially outermost walls of the mold;
   b. introducing a second of said copolymerization compositions into said mold while said mold is rotating at said first speed; and
   c. rotating said mold at a second speed less than said first speed for a time period sufficient to reduce the centrifugal forces on said first composition and enhance the diffusion of said first and second compositions into each other.

4. A method according to claim 3 in which said compositions each include at least one monomer, a polymerization catalyst and an ultraviolet radiation sensitizer and the polymerizing step comprises:
   a. exposing the mixture in the mold to a source of ultraviolet radiation for a predetermined time, while continuing rotation of the mold at said second speed, thereby increasing the viscosity of said diffused first and second polymerization compositions to inhibit their continuing diffusion;
   b. bringing the rotation to a stop while said first and second polymerization compositions are partially diffused; and
   c. curing the partially diffused polymerization mixture to produce a shaped, optical element having a gradient index of refraction generally radial to its axis of rotation.

5. A method according to claim 4 in which the exposing step comprises:
   a. placing an ultraviolet radiation mask, having a density which decreases radially outwardly above the mold so that said central density is axially coincident with the axis of rotation of the mold; and
   b. exposing the mold through said mask to a source of ultraviolet radiation for a predetermined time, thereby increasing the viscosity of the mixture by an increasing ultraviolet exposure radially outward from the axis of rotation.

6. A method according to claim 4 in which the first composition comprises allyl diethylene glycol 2-carbonate as the monomer; benzoyl peroxide as the polymerization catalyst; and benzophenone as the ultraviolet sensitizer.

7. A method according to claim 6 in which the second composition comprises diallyl phthalate as the monomer; benzoyl peroxide as the polymerization catalyst; and benzophenone as the ultraviolet sensitizer.

8. A method according to claim 4 in which the second composition is introduced hypodermically into the mold cavity.

9. A method according to claim 2 wherein said first composition includes an ultraviolet radiation sensitizer and in which the filling and rotating step comprises:
   a. rotating the mold about said axis, while said mold contains a first of said compositions, at a first speed sufficient to force the first composition toward the radially outermost walls of the mold;
   b. exposing said first composition to a source of ultraviolet radiation for a time sufficient to at least induce an increase in the viscosity of said composition;
   c. introducing said second composition into said mold while said mold is rotating at said first speed; and
   d. rotating the mold at a second speed less than said first speed for a time sufficient to reduce the centrifugal forces on said first composition and enhance the diffusion of said first and second compositions into each other.

10. A method of fabricating a plastic optical element having a gradient index of refraction, said method comprising:
   a. providing first and second copolymerizable monomer compositions each having a different index of refraction;

b. introducing said first composition into an element cavity of a mold;
c. rotating the mold at a speed sufficient to obtain centrifugal distribution of said first composition;
d. introducing said second composition into the element cavity, the mold being rotated at a speed sufficient to obtain centrifugal distribution of said second composition during at least a portion of said introducing so that the index of refraction of the composite mixture in said cavity varies gradiently, radially outwardly from the central axis of the mold; and
e. polymerizing said mixture to produce a shaped optical element having a gradient index of refraction.

11. The invention defined in claim 10 wherein said first and second compositions include a gelation inducing sensitizer and said method further includes rotating the mold at a speed after the introduction of said compositions sufficient to permit at least some diffusion of the monomer of one of said compositions into said other composition and subjecting said compositions to gelation inducing radiation during said rotation.

12. The invention of claim 11 wherein said speed is less than the speed of rotation during said introducing of said second composition.

13. The invention defined in clai 11 wherein the intensity of said radiation increases radially outwardly from the axis of rotation of said mold.

14. The invention defined in claim 11 wherein said polymerizing step includes heating the mixture after exposure to said rotation.

* * * * *